United States Patent [19]
Krupa et al.

[11] Patent Number: 5,096,295
[45] Date of Patent: Mar. 17, 1992

[54] SCANNING MONOCHROMATOR

[75] Inventors: Robert J. Krupa, Leominster, Mass.; Edward E. Owen, Nashua, N.H.; Stanley L. Shiller, Newton Heights, Mass.

[73] Assignee: Imo Industries, Inc., Princeton, N.J.

[21] Appl. No.: 664,592

[22] Filed: Mar. 1, 1991

[51] Int. Cl.⁵ .............................. G01J 3/18
[52] U.S. Cl. .................................... 356/334
[58] Field of Search ............... 356/308, 309, 331, 332, 356/333, 334

[56] References Cited

U.S. PATENT DOCUMENTS

| | | | |
|---|---|---|---|
| 4,211,486 | 7/1980 | Magnussen, Jr. et al. | 356/334 |
| 4,469,441 | 9/1984 | Bernier et al. | 356/334 |
| 4,540,282 | 9/1985 | Landa et al. | 356/334 |

Primary Examiner—F. L. Evans
Attorney, Agent, or Firm—Hopgood, Calimafde, Kalil, Blaustein & Judlowe

[57] ABSTRACT

In its preferred embodiment, a scanning monochromator uses a pulse-driven micro-stepping motor to drive a spectral-dispersion element via a reduction-gear harmonic drive. The motor is directly coupled to the input hub of the reduction-gear drive, and the output hub of the reduction-gear drive directly supports the spectral-dispersion element. By selecting a motor with a great number of steps per revolution, and a harmonic drive with a great reduction ratio, a resolution of 5 million pulsed steps is available, per single rotation of the output hub of the reduction-gear drive. This translates into more than 600,000 incremental angular-displacement steps over a usable 45° range of dispersion-element rotation.

16 Claims, 3 Drawing Sheets

SCANNING MONOCHROMATOR

BACKGROUND OF THE INVENTION

This invention relates to spectral measuring devices, and in particular to devices of the scanning monochromator type.

A scanning monochromator consists of an entrance aperture, a rotatable dispersing optical element, which is typically a diffracting grating but sometimes a prism, a drive mechanism for rotating the dispersing optical element, an exit aperture, and any additional optical elements which collimate or focus radiation that enters via the entrance aperture. Radiation entering the monochromator through the entrance aperture and dispersed by the diffraction grating is imaged at the exit aperture as a narrow wavelength band of radiation. The bandwidth of this radiation depends upon groove density of the diffraction grating, the focal length of the optical system, the width of the entrance and exit apertures, and the incident and diffracted angles off the diffraction grating. The dispersed light which exits the monochromator system follows the well-known grating relationship, discussed at pp. 16–17 of "Diffraction Grating Handbook", Bausch & Lomb, Incorporated, Rochester, N.Y. (1970).

Historically, the diffraction grating has been mounted on a platform and rotated by a drive motor through a mechanical drive assembly that includes a sine bar and lead screw. The sine-bar drive mechanism has the advantage of producing a linear change in wavelength at the exit aperture of the monochromator, with respect to the lead screw which drives the sine bar, due to the sinusoidal relationship between grating rotation and dispersion. This has facilitated the use of a linear, mechanical counter attached to the shaft of the lead screw, for display of the wavelength of radiation exiting the exit aperture. But this arrangement has several limitations. First, the lead screw is subject to dust or dirt contamination which can dramatically affect accuracy and performance of the drive system. Second, the lead screw must be lubricated with oil, requiring frequent oiling maintenance to insure proper lubrication. Third, the sine bar rides on a carriage attached to the lead screw; this typically employs a ball and a flat which rub against each other. This is a source of mechanical wear and, if wear is severe enough, the wear is a source of inaccuracy and imprecision of wavelength registration. Fourth, although the accuracy and precision of the drive system can be improved by increasing the length of the sine bar and lead screw, the longer and more costly these devices become, and the more time it takes to rotate the diffraction grating through a given angle. Additionally, the speed at which the lead screw can be rotated is limited by the speed at which oil is literally slung off the lead screw.

With the widespread use of personal computers and microprocessors to control the movement of scanning monochromators, it is no longer essential to have a mechanical wavelength counter attached to the grating drive mechanism. The wavelength can be calculated or derived from a "look-up" table if the drive mechanism does not have a sinusoidal response, as does the sine bar/lead-screw mechanism. This circumstance has facilitated use of drive mechanisms that directly rotate the dispersing element of the monochromator. Examples of direct-drive mechanisms are the galvanometer drive, as in Bernier et al. U.S. Pat. No. 4,469,441, and the worm-gear drive.

The galvanometer-drive system utilizes a galvanometer, coupled directly to the diffraction grating, to rotate the dispersing element. The drive is simple and fast, yet it can suffer from hysteresis when it stops at a particular position, and it must utilize a very high resolution input signal (usually a digital-to-analog converter of 16 or more bits, i.e., $2^{16}$ or more) to control the current to the galvanometer, since current to the galvanometer is related to grating rotation. More importantly, however, the drive has a limited usable range of angular rotation, thereby limiting the wavelength coverage of the monochromator. For example, for angular deflections of about 15°, the galvanometer produces enough heat to change its resistance (impedance), and the change in impedance changes the amount of current needed to rotate the drive. Thus, as the temperature changes, so does the calibration of the drive, in that the needed current per degree of rotation is changing, and it is difficult to reproduce a wavelength (at the exit aperture) or angular position (of the dispersing element) with any precision or accuracy.

In the worm-gear arrangement, the diffraction grating is mounted to a rotatable platform, motor-driven via a worm-gear transmission. The worm-gear transmission is susceptible to gear wear as a function of time, leading to poor accuracy and precision, and ultimately requiring replacement of the transmission.

BRIEF STATEMENT OF THE INVENTION

It is an object of the invention to provide an improved scanning-monochromator system.

A specific object is to meet the above object with a drive system for the dispersing element of a monochromator wherein the drive system avoids wear and inaccuracy problems of prior constructions.

Another object is to provide a dispersing-element drive of such fine resolution and reproducible accuracy as to avoid the need for position-sensed feedback in the control of any specific angular displacement of the dispersing element.

A general object is to meet the above objects with a system of relative simplicity, fast and precise angle-positioning, inherently broad wavelength range, and relative freedom from temperature response or mechanical hysteresis.

The invention in a preferred embodiment achieves the foregoing objects in a scanning monochromator wherein a pulse-driven micro-stepping motor requiring a very large number of steps per output revolution is directly coupled to the input hub of a reduction-gear harmonic drive having a substantial gear-reduction ratio, and the output hub of the harmonic drive is directly coupled to rotate the dispersing element of the instrument. The product of these two reductions, namely, steps per motor revolution, times the harmonic gear reduction, results in an illustrative resolution of 5,000,000 pulsed steps per revolution of the dispersing element; and this translates into more than 600,000 incremental angular-displacement steps over a usable 45° range of diffraction-grating rotation. The torque-transmitting capabilities and backlash-free nature of the harmonic drive, coupled with the essentially no-load condition imposed by direct mounting of the dispersing element, assure precisely repeatable angular settings (i.e. exit-aperture wavelength selection) and troublefree operation, over a very greatly extended life of the instrument.

DETAILED DESCRIPTION

A preferred embodiment of the invention will be described in detail in conjunction with the accompanying drawings, in which.

Figure 1:
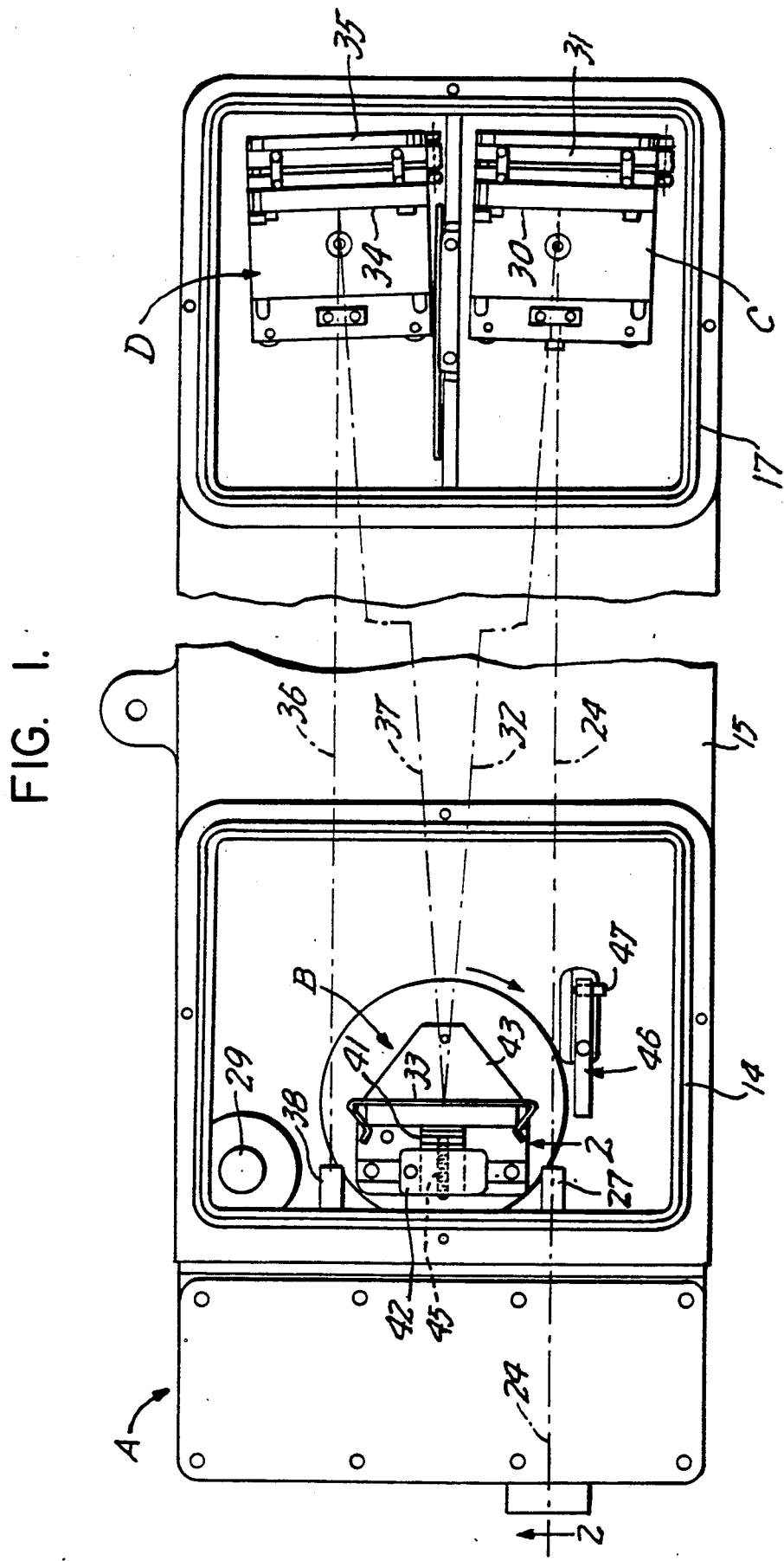
FIG. 1 is a plan view of a scanning monochromator of the invention, with two cover plates removed to reveal internal parts.
Figure 2:
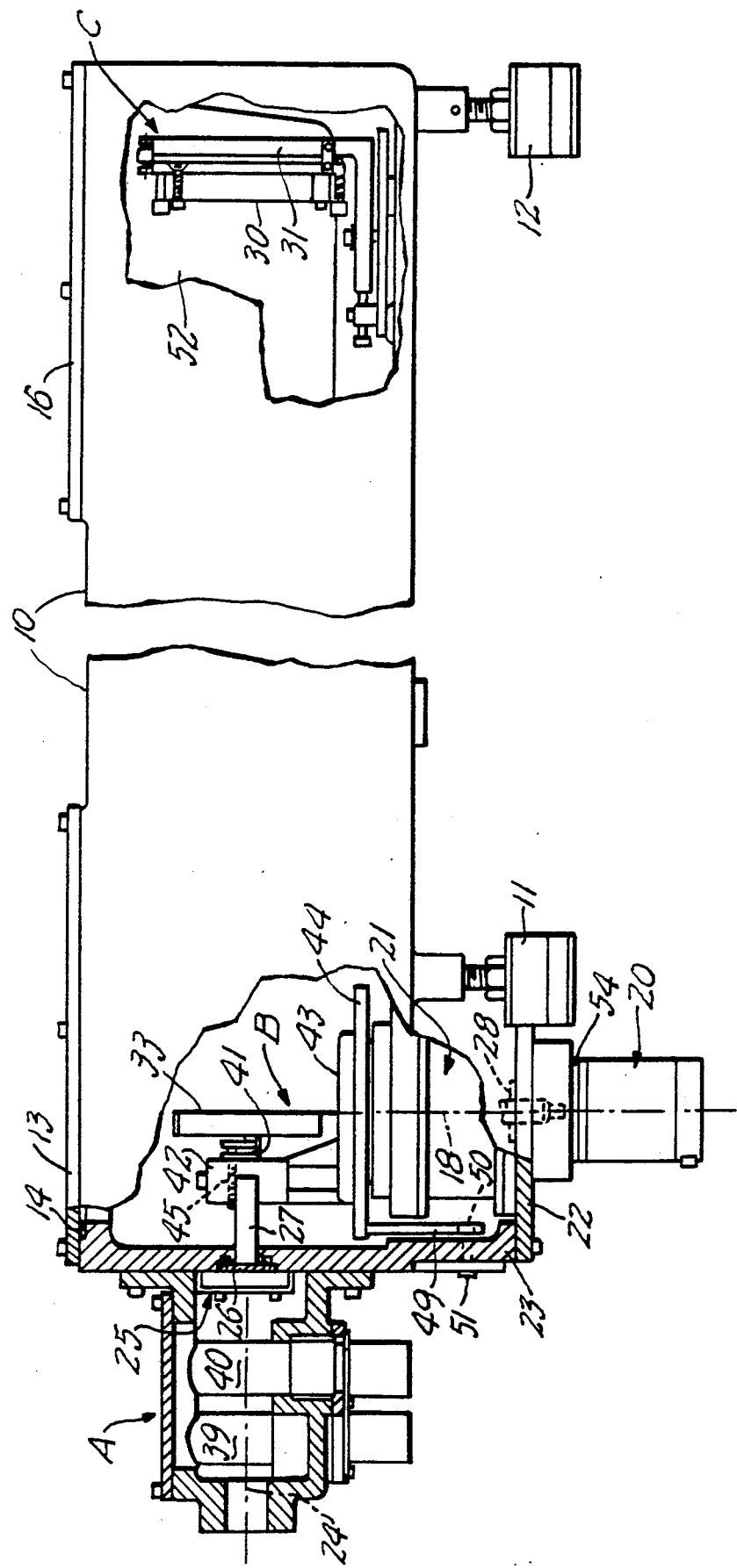
FIG. 2 is a side elevation of the scanning monochromator of FIG. 1, partly broken-away and in section at the plane 2-2 of FIG. 1.

The monochromator instrument of FIGS. 1 and 2 is largely contained within a sealed horizontally elongate prismatic system housing 10 of rectangular section, shock-mounted at 11,12, at its respective longitudinal ends. An entrance/exit assembly A of means to illuminate and position specimen materials for analysis is removably sealed to housing 10 at one longitudinal end. A first cover plate 13 is removably sealed by means 14 to the rim of a first opening near one end of the upper panel 15 of the housing, providing installation and adjustment access to a rotatable diffraction-grating assembly B. A second cover plate 16 is removably sealed by means 17 to the rim of a second opening near the other end of panel 15, providing installation and adjustment access to mirror assemblies C, D, on the respective lateral sides of a centrally located vertical plane of housing symmetry which extends the length of the housing and which includes the vertical axis 18 of rotation of the grating assembly B.

A motor 20 and reduction-gear transmission 21 are unitized to include an adapter or mounting plate 22 having removably sealed assembly to the rim of a downwardly open motor-mounting formation in the lower-panel portion 23 of housing 10. The diffraction-grating assembly B is mounted to the output hub or flange of the transmission 21. The vertical axis 18 of grating-assembly rotation is also the central axis of motor 20 and transmission 21.

The assembly A has a port for admission of light on an illuminating axis 24 to an aperture or slit assembly 25, at a window 26 in sealed relation to an entrance port and shielding tube 27 carried at the adjacent end wall of the housing. This sealed closure at 26, and the sealed closures at 13, 16 and 22, as well as a drive-shaft seal schematically indicated at 28, complete the envelope integrity of housing 10, whereby an evacuating-pump connection at 29 can, if desired, establish a vacuum environment for all optical components and ray paths involved in scanning monochromator operation.

The optical ray path will be recognized as conforming to the Czerny-Turner configuration of a plane-grating monochromator. Thus, light entering the entrance aperture on axis 24, passes the length of housing 10 to a first collimating mirror 30 with suitably adjustable means 31 of support to assure focus on the entrance aperture and to direct the central axis 32 of its collimated ray bundle to the center of the diffraction-grating 33, it being noted that the vertical centerline of the diffraction grating 33 will have been adjusted to coincide with the vertical axis 18 of motor (20) and harmonic-drive (21) rotation. The second or focusing mirror 34 is a duplicate of mirror 30 with suitably adjustable means 35 of support to assure focus at the exit aperture on axis 36 while the central axis 37 of its bundle of collimated-ray response coincides with the diffraction-grating center of entrance-ray (32) incidence.

The exit axis 36 passes through a tubular shield 38 to and through an exit aperture (not shown), analogous to the slit assembly and sealed window described at 25/26 for the case of the entrance axis 24. Monochromatic radiation passing the exit slit is monitored by suitable means contained within the housing of the entrance/exit assembly A. Illustratively, such monitoring means includes a solar-blind photomultiplier 39, for "straight-shot" exposure to ultraviolet light on the alignment of the exit axis 36, and a visible-light photomultiplier 40 with selectively operable means (not shown) for folding the exit axis 36 away from the straight-shot alignment to a folded alignment for monitoring visible light at 40, to the exclusion of ultraviolet radiation at 39.

Conventional means of finely adjusted positioning are shown on the supporting structures at C and D for the respective mirrors; such means therefore need not be described. Also shown between the supporting structures at C and D is a vertically mounted baffle plate 52, whereby to better mutually isolate the respective responses of mirrors 30, 34.

At location B, the diffraction grating 33 is seen to include a mounting stem 41 which is inserted horizontally into a clamp 42 at the upper end of a bracket 43 which, in turn, is mounted to a circular turntable 44 that will be understood to be coupled to the output hub of the harmonic-drive 21; stem 41 is slitted to permit setscrew (45) adjustment of slight up/down flexing of grating 33 about the slit-weakened portion of stem 41. The turntable 44 presents an axially short cylindrical periphery for drag-torque engagement to the friction-pad end of a brake-arm assembly 46 which, as seen in FIG. 1, includes means 47 for adjustably selecting a minimum of drag torque in order to assure a low level of friction action in approach to and retention of a predetermined angular setting of grating 33 about its axis (18) of rotation. Preferably, the means 47 includes a captive softly compliant spring (not shown) to enable careful and precise adjustment of a desired low level of brake-friction development in application to the turntable 45.

To assist in locating a "zero" reference for angular positioning of turntable 44 and the diffraction grating 33 which it supports, an arm 49 is shown fixed to and depending from turntable 44, at a location of maximum practical radial offset from axis 18. Arm 49 carries a small permanent-magnet element 50, and a magnetic detector, preferably a Hall-effect transducer 51 is shown mounted to the end wall of housing 10, poised for identifying electrical response to proximity to the field of magnet 50, when grating 33 is in the approximate position of essentially only reflecting the collimated ray bundle on axis 32 into the collimated response ray bundle on axis 36. The Hall-effect transducer is effectively an electric switch, used to locate a defined starting position if the drive ever becomes "lost". For example, if the power is off and the rotary location of the drive mechanism is not known, the drive is rotated until the sensor 51 picks up the magnet. This position, which will be understood to have been previously defined and digitally stored in computer means 56 (FIG.

3) associated with control of the pulse drive of motor 20, now provides a starting point from which drive rotation can be calibrated. Without this "switch" at 51, it would be difficult (but not impossible) to locate the starting position for grating rotation.

The gear-reducing harmonic drive 21 may be a commercial product, Model PCR 5C-200-1, available from Harmonic Drive Corporation of Wakefield, Mass., operating directly from the output shaft of a microstepping motor 20. The harmonic drive may be as described in U.S. Pat. No. 2,906,143, and the indicated model has a 200:1 gear-reduction ratio. Further effective reduction (i.e. fineness of driven-angle resolution) is achieved by selection of a motor 20 that requires a large number of pulse-responsive steps for a single rotation of the motor-output shaft. In the presently preferred embodiment, motor 20 requires 25,000 successive electrical input pulses, to achieve as many incremental-angle steps, for one rotation of its shaft. This translates to a total of 5 million pulsed steps, for one rotation of the turntable 44; in this preferred embodiment, the grating 33 has a 45° range of angular displacement, with respect to the "zero" or solely reflecting aspect of grating 33. This being the case, 625,000 stepping pulses to motor 20 are needed to run grating 33 through its 45° range of displaceability.

For the preferred embodiment, the indicated commercial motor 20 and harmonic drive 21 were subjected to slight modification: (1) to accommodate the adaptor or mounting plate 22, (2) to incorporate vacuum-seal means 28 at motor 21 connection to the harmonic drive 21, and (3) to eliminate elastomeric-seal means which is customarily supplied for the output hub of the harmonic drive. The latter measure will be understood to avoid any residual torsional stress operative at the output of the harmonic drive because the number of steps per rotation means an incredibly small incremental angle grating advance per step, amounting to $7 \times 10^{-5}$ degrees per step, i.e: 0.25 arc-sec/step. Residual torsional stress of an elastomeric output-hub seal might relieve itself in the equivalent amount of several of such finely divided steps, upon achieving a driven grating-displacement angle; to retain such a seal in the described monochromator would therefore be a source of positioning errors and ambiguity, effectively jettisoning the precision and resolution which flow from the indicated $10^{-5}$ order of magnitude of angular accuracy inherent in the described system. On the other hand, a low level of torsional friction, devoid of torsionally stressed compliant deformation, is selectively available through the described brake-arm adjustment at 47, to retain precisely indexed displacements of grating 33.

Figure 3:
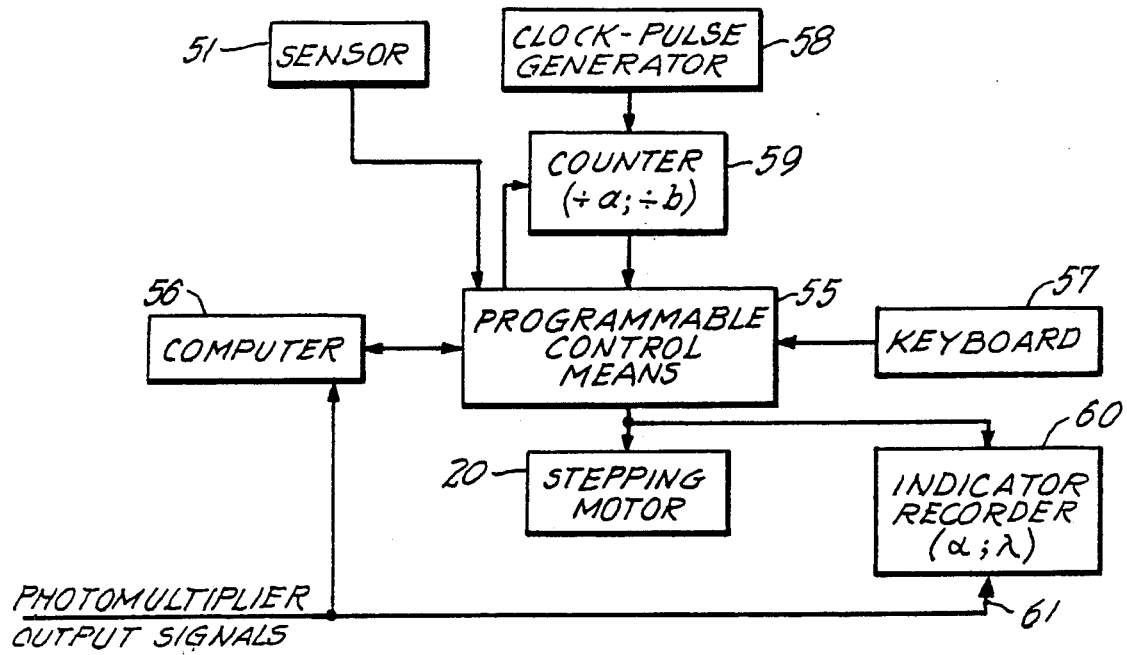
FIG. 3 is a simplified block diagram of electrical drive and indicator circuitry for the monochromator of FIGS. 1 and 2.

FIG. 3 is a simplified diagram that is suggestive and schematically indicative of control for the described stepping-motor (20) drive of the gear reducing harmonic drive (21). As shown, control means 55 in conjunction with a computer 56 is programmable and/or "manually" operable pursuant to digital inputs from keyboard means 57. Basic pulse input to control means 55 derives motor-stepping pulses from a clock-pulse generator 58, in conjunction with counter means 59 having provision for selection of different divided pulse-rate outputs to the control means 55; such selectivity is parenthetically suggested by alternate factors a, b by which the clock-pulse rate can be divided, so as to provide selection of "fast" or "slow" stepping speeds of motor 20. The control connection from means 55 to counter 59 will be understood to govern the functions of (i) determining whether to divide by a or by b, (ii) to determine the number of stepping pulses to be supplied to motor 20, and (iii) to determine the direction of the count (i.e. count up, or count down) whereby to determine the direction of motor (20) rotation. An indicator/recorder 60 is shown connected to monitor the controlled stepping-pulse output to motor 20, whereby to provide an instantaneous indication and/or recording of diffraction-grating angle or wavelength, for incremental wavelength scanning readable at one or the other of photomultipliers 39, 40, and a second input 61 to the indicator/recorder 60 is schematically shown to supply instantaneous photomultiplier response amplitude, enabling two-dimensional indication, display or recording at 60, for observed exit-aperture amplitude as a function of grating-angle α (or wavelength λ) departure from the "zero" (or maximum reflection) location. Finally, the output of Hall-effect transducer 51 is shown as having an additional input connection to the control means 55.

A typical operational scenario for the drive 20/21 will now be outlined.

1. The magnetic "home" position is found by scanning the drive in one direction until the Hall-effect detector 51 senses magnet 50, with the drive rotating at a high velocity to cover a full rotation of grating 33 within a short period of time. Once the magnet is detected, the drive stops, backs out 10,000 steps, then slowly moves back into the magnet-detected position, to more accurately locate the same. After the magnet is thus located, the drive continues to move to the "zero" position of the monochromator.

2. "Zero" is defined as the zero-order signal which is produced when all incident light striking the diffraction grating is reflected from the grating. At zero order, the grating acts as a simple mirror, producing little diffracted light. This zero-order signal is the largest of any signal produced by the system and can be used as a starting point for scanning a spectrum.

3. After zero order is established, the drive moves to a known diffracted-wavelength position, to obtain the position of a second reference line. Typically, this is an argon reference hue, in the blue region of the spectrum, at about 400 nm. Once the location of this line is established, a 2-point calibration of the drive can be performed mathematically. This calibration can now be used to crudely locate the angular position for diffraction at any other wavelength.

4. When this 2-point calibration is complete, analytical wavelength positions can be calculated and sought out. For example, copper at 324.7 nm, can be located by calculating its approximate position, in steps from zero order. The drive is moved to a position slightly shy of the copper position and is caused to scan a wavelength "window" which contains this copper-emission line. Once this line is detected, its position is noted, and the next line can be sought and its position noted. These calibrated positions are thereafter used as points to which to return, when analytical data are to be collected for a given element during analysis of a sample of unknown composition.

Advantages realized by the structure thus-far described illustrate why it is the preferred embodiment of the invention. These advantages can be enumerated:

1. A micro-stepping motor, capable of at least 200 and preferably 25,000 steps per revolution is selected not only for its great number of steps per revolution, but also because of its high output torque, and because it is able to reproducibly take the exact number of steps it is told to take (it rarely, if ever, skips steps).

2. Reproducibility in taking the commanded number of steps eliminates the need to provide an active feedback mechanism to monitor fidelity of motor-tracking to command-pulse steps; thus, the operator can be assured, without feedback, that the motor has indeed displaced its output shaft (and, therefore, grating 33) by the number of incremental angle steps that were instructed.

3. The harmonic-drive gear reducer 21 is driven by the stepping motor to provide increased resolution in the rotation of the diffraction grating. As a 200:1 gear reducer, in conjunction with a stepping motor capable of 25,000 steps per revolution, it can achieve 5 million steps per output revolution. However, there are other unique features which add to harmonic drive utility in the described scanning-monochromator application.

4. The described drive 21, modified as indicated above, can be used in a vacuum environment, provided that internal lubrication of low vapor pressure is used in the drive, thus allowing drive 21 to be placed in the vacuum chamber 10. By placing drive 21 in the vacuum chamber 10, the vacuum seal (28) can now be at the input shaft of the drive 21, and even if the thus-located seal is a source of any error, the error is reduced to insignificance, by the gear-reduction ratio of the harmonic drive. The above-noted torsionally stressed action of an elastomeric seal is thus essentially eliminated by its placement only at the input-shaft end of the harmonic drive.

5. Vacuum-seal location at 28 is preferred because the stepping motor 20 will run quite hot, typically 40° to 60° C. This heat must be isolated from the optical elements and their supporting structure because heat can cause expansion of the optical bed, with a resulting change in focus of the monochromator and a change in the angular location at which particular analytical wavelengths are sought. To reduce such heating effects, a thermal barrier 54, in the form of a low thermal conductivity heat barrier of suitable plastic (e.g. polycarbonate) is placed between the stepping motor and the input of the harmonic drive. In addition, the entire monochromator is thermally controlled at 100°±1° F., by placing it in an enclosure with a thermostatically controlled heater assembly.

6. As compared with monochromators having lead-screw or sine-bar drive mechanisms, the described harmonic-drive arrangement, with direct-motor drive is not in the slightest vulnerable to contamination by dust or airborne particulates. A speck of dust on the fine threads of a lead screw literally acts like a boulder, causing large errors in the accuracy and repeatability of the drive system. Also, a lead screw must be lubricated every two weeks or so, by the operator; and after lubrication, the lead screw behaves like a totally different mechanism, requiring recalibration from scratch and a run-in of the drive, involving numerous full-scale repeated cycles, to evenly distribute the oil used for lubricating the screw.

7. The harmonic drive 21 is of inherently anti-backlash nature. The meshing of teeth within the drive accounts for a virtually backlash-free system. However, some small backlash is experienced due to the nature of the stepping motor (20) and due to the vacuum seal (28) at the input shaft of the drive. But, as discussed above, this small backlash at the input to the drive (21) is reduced by a factor of 200:1, since it occurs prior to gear reduction at 21.

8. The indicated harmonic drive at 21 requires literally no maintenance, in that the described monochromator system dramatically under-utilizes the rated output speed and torque of the drive. There is thus no need for concern as to the drive being subject to wear with time.

9. Since the diffraction grating and its mount (43, 44, 45) are so light, in contrast to the relatively great rated output torque of the harmonic drive, the latter is always operated under essentially no-load conditions; the low-level drag torque achieved by brake action at 46, 44 assures an accurate and positive stop when the drive comes to rest and further assures against any backlash attributable to the vacuum seal 28 at input to the drive.

Figure 4:
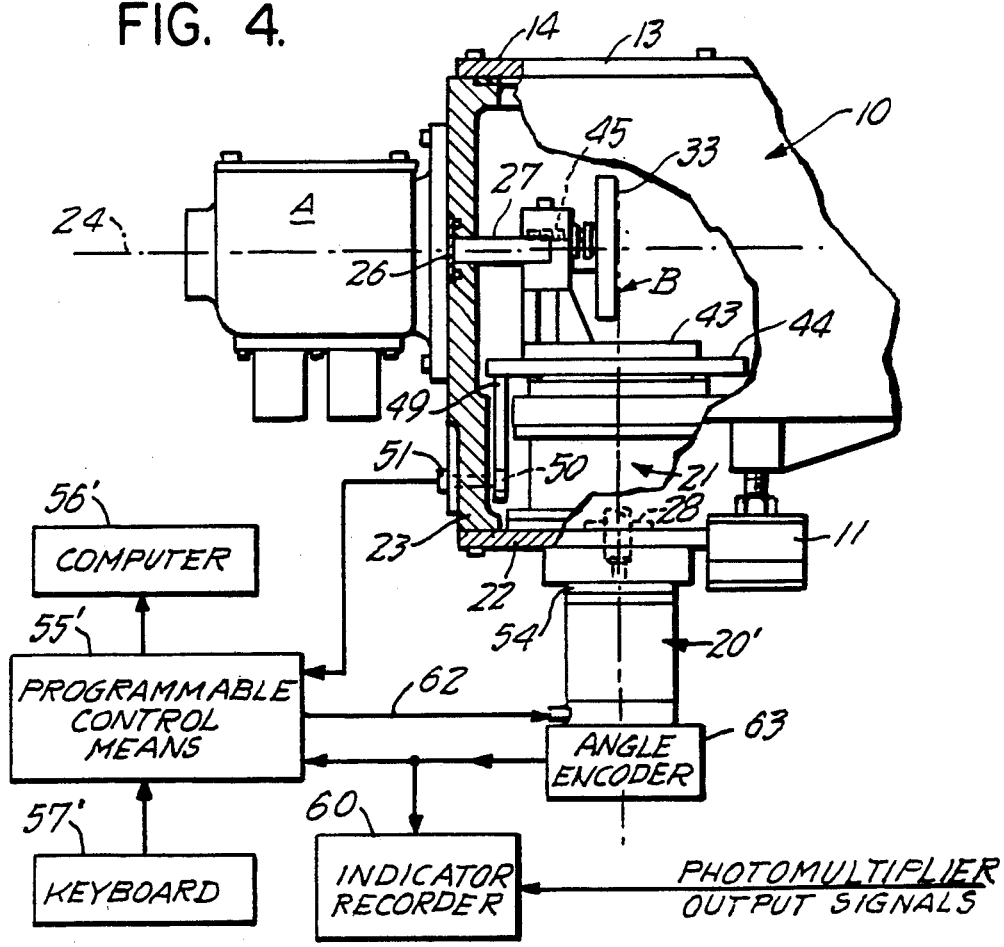
FIG. 4 is a simplified fragmentary diagram of a modified, but not preferred, drive for a scanning monochromator.

FIG. 4 schematically shows that the invention is not necessarily limited to the stepping-pulse drive available with motor 20 of FIGS. 1 and 2, although, as indicated above, the embodiment of FIGS. 1 and 2 is definitely preferred for reasons given above, not the least of which is the great number of discrete angles that can be called for at motor 20, without need for feedback control. In FIG. 4, on the other hand, the parts are as previously described, except that motor 20' is illustratively, a so-called stalled-torque motor wherein a separate motor winding is provided for each direction of motor (20') rotation and wherein current is provided at all times to both windings, to produce zero speed when the windings produce equal and opposite torque, but to drive in one or the other direction in accordance with the sign of instantaneous torque unbalance. In FIG. 4, the line connection 62 from control means 55' to motor 60' will be understood to govern the drive motor in such stalled-torque operation, in accordance with the extent to which a programmed angle setting (evaluated against instantaneous motor-shaft angle encoding at 63) indicates that further drive torque in a given direction is still needed, for achievement of the programmed angle. Of course, as in FIG. 1, the use of motor 20' to directly drive the harmonic-drive reduction gear 21 provides greatly enhanced and finely divided resolution of grating-angle positioning; but such resolution requires a great number of binary digit elements, e.g. 15, for a $2^{15}$ subdivision of one revolution of motor 20'.

What we claim is:

1. A scanning monochromator system, comprising a system housing, including means defining an entrance aperture and means defining an exit aperture, a diffraction grating mounted for rotation within said housing and arranged for spectral dispersion of radiation passing through said entrance aperture for transmission toward said exit aperture, a gear-reducing harmonic drive mounted to said housing and having an output hub within said housing, a turntable mounting said diffraction grating and connected for direct-drive rotation by said output hub, brake means reacting between said turntable and said housing for imposing torsional drag on rotation of said turntable, a micro-stepping motor connected for direct-drive rotation of said harmonic drive, and control means including a pulse counter and means for supplying stepping-pulse signals to said motor.

2. The system of claim 1, in which the reduction ratio of said harmonic drive is at least 20:1.

3. The system of claim 2, in which said ratio is at least 200:1.

4. The system of claim 1, in which said stepping motor requires at least 200 steps per revolution of said input hub.

5. The system of claim 4, in which said stepping motor requires at least 25,000 steps per revolution.

6. The system of claim 1, in which said harmonic drive includes a drive housing that is sealed to and completes a sealed envelope with said system housing, said drive housing having an input hub that is accessible externally of said system housing, said drive housing including a vacuum seal of said input hub to the exclusion of said output hub.

7. The system of claim 1, in which said brake means comprises a cantilevered arm mounted within said housing, and a friction element at the cantilevered end of said arm, said turntable having a circumferential region engaged by said friction element.

8. The system of claim 1, in which said system housing is horizontally elongate, extending between first and second longitudinal ends, said turntable and grating being mounted on a vertical axis of rotation near said first end, said axis being in a longitudinally extending vertical plane of optical symmetry within said system housing, said entrance and exit apertures being on opposite sides of said plane at said first end, and a pair of collimating mirrors mounted near said second end and on opposite sides of said plane, for imaging said entrance aperture at said exit aperture via collimated light incident upon and dispersed by said grating.

9. The system of claim 8, in which said turntable mounts a permanent-magnet element at radial offset from said vertical axis, and a magnetic-field detector mounted within said housing at a locale which substantially identifies a reference angle of grating orientation wherein substantially only grating-reflected light from said entrance aperture is imaged at said exit aperture.

10. The system of claim 9, in which said detector is a Hall-effect transducer.

11. The system of claim 1, in which wavelength-indicating means connected to said pulse counter is correlated with stepping pulses delivered to said motor.

12. The system of claim 1, in which said system housing is so shock-mounted at its respective ends as to establish a generally horizontal plane of shock-mounted support, and wherein said motor is suspended beneath said horizontal plane.

13. The system of claim 9, in which said turntable is rotatable to an angular limit that is at least 30° offset with respect to said reference angle.

14. The system of claim 13, wherein said limit is at substantially 45° offset with respect to said reference angle.

15. A scanning monochromator system, comprising a system housing, including means defining an entrance aperture and means defining an exit aperture, a diffraction grating mounted for rotation within said housing and arranged for spectral dispersion of radiation passing through said entrance aperture for transmission toward said exit aperture, a gear-reducing harmonic drive mounted to said housing and having an output hub within said housing and an input hub that is accessible externally of said housing, a turntable mounting said diffraction grating and connected for direct-drive rotation by said output hub, brake means reacting between said turntable and said housing for imposing torsional drag on rotation of said turntable, drive means including an electric motor and speed-reduction means connected for direct drive of said input hub, and control means including angle-sensing means responsive to instantaneous angular orientation of said input hub.

16. The system of claim 15, in which said electric motor is a stalled-torque motor.

* * * * *